No. 641,474. Patented Jan. 16, 1900.
M. J. TODD.
HARROW TOOTH HOLDER.
(Application filed Feb. 28, 1899.)
(No Model.) 2 Sheets—Sheet 1.
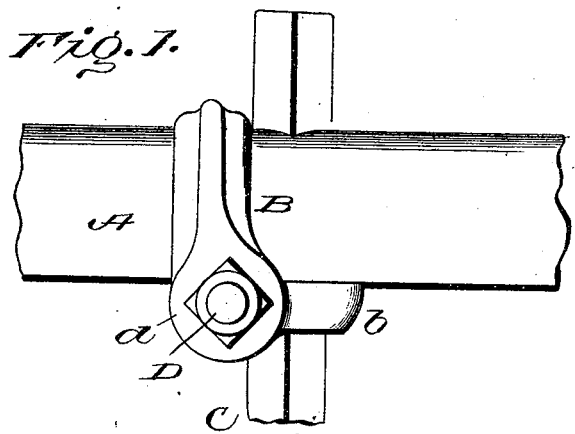
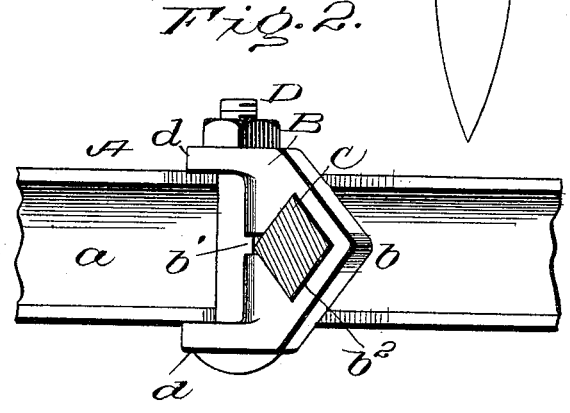
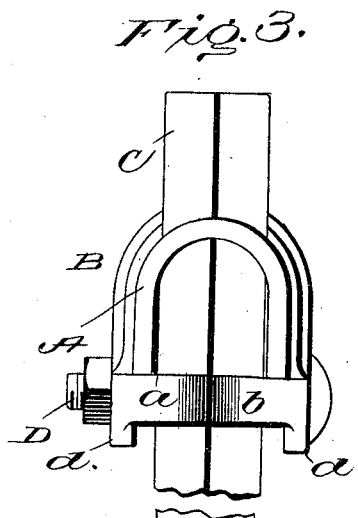
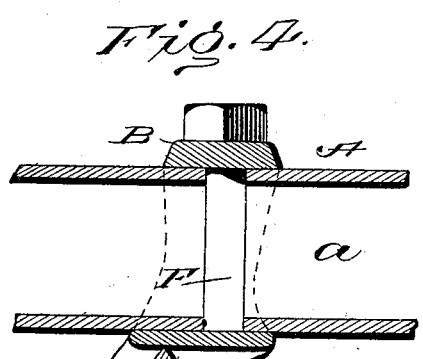
Witnesses
Inventor
Marquis J. Todd
Attorney No. 641,474. Patented Jan. 16, 1900.
M. J. TODD.
HARROW TOOTH HOLDER.
(Application filed Feb. 28, 1899.)
(No Model.) 2 Sheets—Sheet 2.
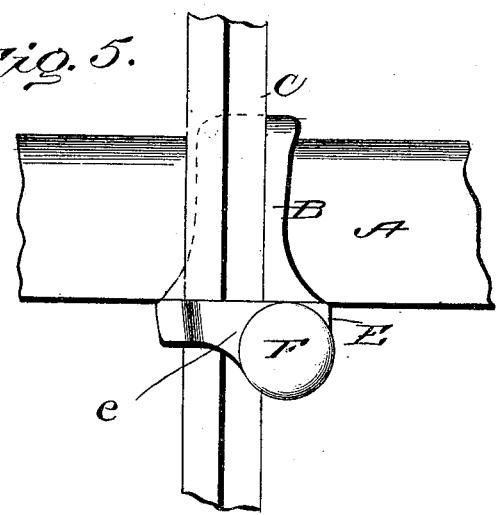
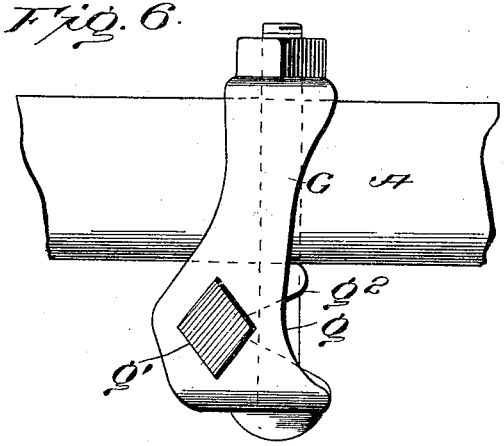
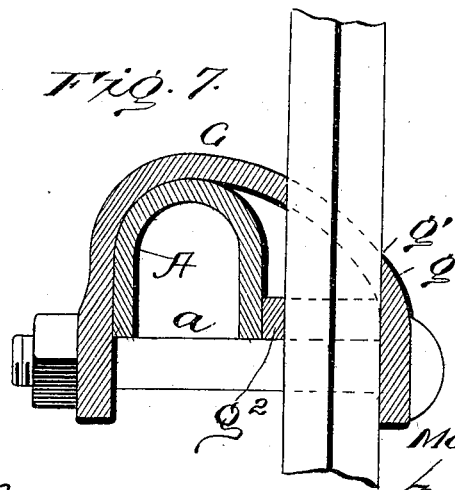
Witnesses Inventor
Marquis J. Todd
Attorney

UNITED STATES PATENT OFFICE.

MARQUIS J. TODD, OF BUFFALO, NEW YORK.

HARROW-TOOTH HOLDER.

SPECIFICATION forming part of Letters Patent No. 641,474, dated January 16, 1900.

Application filed February 28, 1899. Serial No. 707,206. (No model.)

*To all whom it may concern:*

Be it known that I, MARQUIS J. TODD, of Buffalo, in the county of Erie and State of New York, have invented certain new and useful Improvements in Harrow-Tooth Holders; and I do hereby declare the following to be a full, clear, and exact description of the invention, such as will enable others skilled in the art to which it appertains to make and use the same.

This invention contemplates certain new and useful improvements in harrow-tooth holders.

The object of the invention is to provide a holder which will securely bind a spike-shaped harrow-tooth to its bar by gripping it at a plurality of opposite points—one which will be composed of but few parts and which will be simple in construction, inexpensive, and durable.

The invention will be hereinafter fully set forth, and particularly pointed out in the claims.

In the accompanying drawings, Figure 1 is a side elevation showing one of the forms of my improved tooth-holder. Fig. 2 is a bottom plan view, and Fig. 3 an end view, of the same form of embodiment. Figs. 4 and 5 are respectively a sectional view and a side elevation of a second form of construction. Fig. 6 is a plan view, and Fig. 7 a sectional view, of a third form of construction.

Referring to the drawings, A designates a bar of inverted-U shape having a lower longitudinal opening $a$. A series of such bars is used in each section of a harrow, and they may be axially adjusted by any well-known means.

The tooth-holder comprises a clip which embraces the bar, a split portion formed with the clip having an angular opening to accommodate the tooth, and a nutted bolt which serves the double function of binding the clip on its bar and gripping the tooth between the sections of the split portion.

B designates the clip, which is of malleable metal, C the harrow-tooth, and D the nutted bolt. In Figs. 1, 2, and 3 the clip is shown as having its two sides united by a horizontal portion $b$, which extends across the longitudinal opening in the bar. This horizontal portion is split, as at $b'$, and formed with an angular opening $b^2$, which extends into the split at one of its meeting angles. The angularity of this opening corresponds to the shape in cross-section of the harrow-tooth. In the present instance it is diamond-shaped; but any polygonal form may be observed, both in the formation of the tooth and the opening. The tooth C is extended through the opening $b^2$ and up between the sides of bar A and out through a correspondingly-shaped opening in the top or crown of the bar. The bolt D is passed through coincident ears $d$, formed with the sides of the clip. By tightening this bolt the clip is firmly bound on the bar and the split portion is made to firmly grip the tooth. In thus drawing the parts together the tooth will be firmly gripped on all sides and at two opposite edges.

My invention comprehends various forms of construction, of which the foregoing is probably preferred.

Instead of passing the tooth up through the harrow-bar it may be located at one side and may also when so located be passed up through the upper portion of the clip.

In Figs. 4 and 5 the split portion E, having the angular opening for the tooth, is shown as extending laterally from one of the sides of the clip, the outer end of such split portion having an apertured ear $e$, through which and a corresponding ear of the other side of the clip the nutted bolt F is passed.

In Figs. 6 and 7 the clip G is of increased width and curvature, and in the upper portion of its side $g$ is formed an opening $g'$, through which the tooth is designed to pass. In this form the split portion $g^2$, having the angular opening for the tooth, is formed with the side $g$ and is located between the latter and the adjacent side of the bar. The nutted bolt is passed through ears, the same as shown in Figs. 1 to 3.

The advantages of my invention are apparent. In the various forms of embodiment the holder comprises but two parts, the clip and the nutted bolt, the latter serving the double function of holding the clip on its bar and binding the tooth. The tooth being angular in cross-section and the gripping portion of the clip of corresponding formation, the former is securely held in position when the split portion of the clip is drawn against the tooth.

I claim as my invention—

1. The combination with a harrow-bar, of a clip engaging such bar and having integral therewith a split portion formed with an opening for the harrow-tooth, and a binding-bolt for holding the clip on its bar and gripping the tooth by said split portion, as set forth.

2. The combination with a harrow-bar, of a clip embracing such bar and having a horizontal portion formed with an angular opening which is split at one point, and a bolt for clamping said clip on said bar and gripping said horizontal portion against a tooth inserted in said opening.

3. The combination with a harrow-bar, of a clip embracing such bar and having a horizontal split portion formed with an angular opening to accommodate a harrow-tooth, apertured ears carried by said clip on opposite sides of said bar, said split portion being intermediate of said ears, and a bolt inserted through said ears, substantially as set forth.

4. The combination with the U-shaped bar, of a clip embracing the top and sides of said bar, and having apertured ears in line beneath said bar, a horizontal split portion formed with said clip and having an angular opening therein, and a bolt inserted through said ears and extended beneath said bar, substantially as set forth.

5. The combination with the U-shaped bar, of a clip embracing the top and sides of said bar, and having apertured ears in line beneath said bar, a horizontal split portion located beneath said bar and having an angular opening therein, and a bolt inserted through said ears, substantially as set forth.

6. The combination with the U-shaped bar having an angular opening therein, of a clip embracing said bar having a split portion formed with an angular opening coincident with the opening in said bar, said split portion being extended beneath the bar, and a bolt engaging the sides of said clip for binding the latter on said bar and gripping a tooth inserted through said angular openings, substantially as set forth.

In testimony whereof I have signed this specification in the presence of two subscribing witnesses.

MARQUIS J. TODD.

Witnesses:
GRAFTON L. McGILL,
J. NOTA McGILL.